May 23, 1972 V. PETERSEN 3,664,676

CYLINDER HEAD GASKET ASSEMBLY

Filed Sept. 11, 1970

INVENTOR.
Victor Petersen
BY
Robert J. Outland
ATTORNEY

United States Patent Office 3,664,676
Patented May 23, 1972

3,664,676
CYLINDER HEAD GASKET ASSEMBLY
Victor Petersen, Westmont, Ill., assignor to General
Motors Corporation, Detroit, Mich.
Filed Sept. 11, 1970, Ser. No. 71,321
Int. Cl. F16j 15/10
U.S. Cl. 277—166                                    7 Claims

ABSTRACT OF THE DISCLOSURE

In a preferred embodiment, a cylinder head gasket includes a thin annular sheet metal member having raised copper portions on its upper and lower surfaces adjacent the inner periphery to act as a combustion seal and having a plurality of coolant openings, each receiving a snap-in grommet. The grommets preferably comprise a soft elastomeric inner seal portion bonded or otherwise retained to a plastic resin base outer insulating portion. A peripheral groove adjacent one end of each grommet permits loose retention of the grommets within their respective openings of the sheet metal member such that upon installation of the gasket, the grommets may move laterally to seat squarely within counterbored portions surrounding the water passages of the associated cylinder liner.

BACKGROUND OF THE INVENTION

This invention relates to cylinder head gaskets and, more particularly, to a cylinder head gasket assembly and joint for sealing the combustion chamber and coolant passages defined between the cylinder head and liner of an internal combustion engine.

In the art relating to cylinder head gaskets, it is known to provide between the cylinder head and liner of a diesel engine, gasket means including a metal seal ring surrounding the liner bore and acting as a combustion seal in combination with a plurality of elastomeric rings received in counterbored recesses of the liner and engaged by a flat surface of the cylinder head to seal the coolant passages extending between the two members. In some constructions, the elastomeric rings have been provided with outer sleeves of glass-filled Teflon or the like to protect the rubber seal portions from deterioration due to contact with hot exhaust gases and oil. It is further known in the art to provide an integral gasket wherein a plurality of resilient rings are fixedly molded onto depressed portions of a sheet metal gasket to provide a unitary gasket member, including both a metal combustion seal and a plurality of resilient coolant passage seals, the latter being received within the liner counterbores, as previously described.

With respect to the multi-piece seals, it is objected that additional work is required during installation due to the necessity of handling a large number of pieces. Also, it is possible that during assembly one of the seal rings may be incorrectly seated, causing early failure, or may be inadvertently omitted, with a similar result. Some of these difficulties are overcome by the integral unit wherein all the seal rings are molded together with the metal combustion seal, but this unit is subject to the problem that there is no ability to adjust the position of the seal rings to account for variations in the spacing and position of the various cylinder liner counterbores, which may be caused by dimension variations within the normal manufacturing tolerances.

SUMMARY OF THE INVENTION

The present invention provides a gasket assembly which overcomes the foregoing difficulties by providing a gasket assembly in which a plurality of coolant seal rings or grommets are loosely retained for lateral movement within a sheet metal member, which includes raised metal sealing portions along its inner edges to act as combustion seals. The individual coolant seal rings are grooved on their outer peripheries adjacent one end so that they may be snapped into openings provided in the sheet metal member with their other ends extending downwardly to be received within the liner counterbores. The seal ring grooves are dimensioned to provide adequate lateral movement of the seal rings within the metal member to account for any dimensional variation in the positioning of the liner counterbores.

To obtain a long life seal construction, composite seal rings are provided which include an inner elastomeric sealing portion molded or otherwise retained to a plastic resin base outer insulating portion. The elastomeric inner portion is preferably made of a silicone rubber compound while the outer insulating portion is preferably formed of a glass-filled polytetrafluoroethylene (PTFE) material, more commonly known by one of its trade names, Teflon. Instead of molding the inner and outer portions of the seal rings together, they may be retained together by bonding with suitable adhesives or by a mechanical connection, such as a tongue and groove arrangement.

The invention provides the advantages of a unitary seal arrangement while retaining both the ability to accommodate certain tolerance variations in the positioning of the counterbores in which the seal rings must rest and the ability to use seal rings of the most advanced and longest lasting type incorporating both sealing and insulating portions. These and other advantages of the invention will be more fully understood from the following description of a preferred embodiment taken together with the accompanying drawing.

DESCRIPTION OF THE PREFERRED EMBODIMENTS

Figure 1:
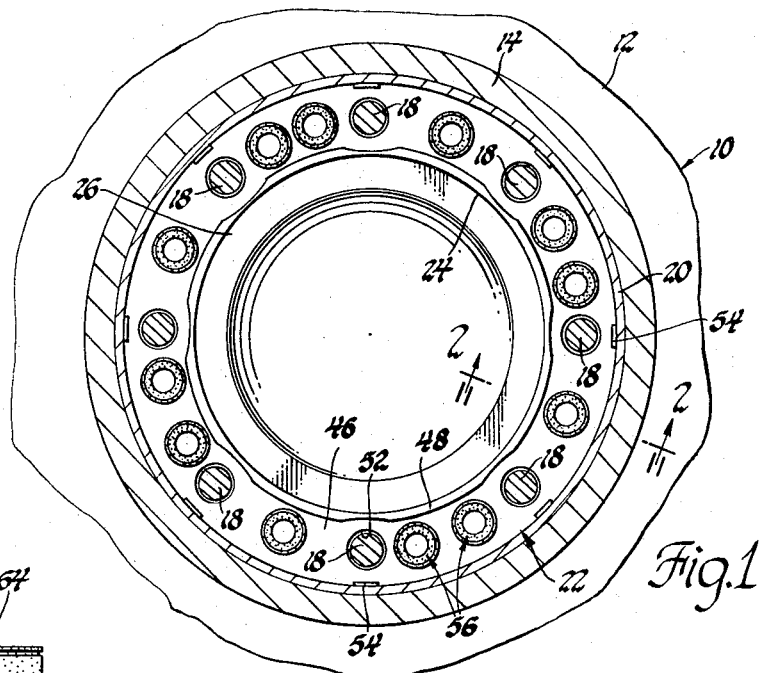
FIG. 1 is a cross-sectional view of an internal combustion engine taken transversely of one of the cylinder liner and head assemblies and disclosing details of a gasket assembly formed according to the invention.

In the drawing, numeral 10 generally indicates an internal combustion engine of a well-known diesel type, commonly used in locomotives, and provided with removable cylinder assemblies, wherein the cylinder heads are individually secured to removable liners in which the pistons are reciprocably disposed. Engine 10 includes a fabricated frame or crankcase 12 which includes an annular head pot 14. Within the head pot is received a cylinder assembly including a cylinder head 16 secured by means of studs 18 to a cylinder liner 20 and having the joint between the cylinder liner and head sealed by a cylinder head gasket assembly formed according to the invention and generally indicated by numeral 22.

Cylinder liner 20 has a central bore 24 in which is received a piston 26, the upper surface of which coacts with the cylinder liner and head to define a combustion chamber 27. The cylinder head and liner are respectively provided with coolant jackets 28, 30, which are communicated by means of aligned drilled passages 32, 34 of the cylinder head and liner, respectively. Passages 32, 34 open through the opposed end faces 36, 38 of the cylinder head and liner, respectively, passages 34 being surrounded at their outer ends by counterbores 40 in the end face 38 of the liner.

At the outer edge of end face 38 the liner is provided with a pilot ridge 42 which is received in a cooperating annular recess 44 of the cylinder head so as to provide for the axial alignment of the two members inwardly of the pilot ridge 42. The various counterbores 40 and the remaining flat surface of the liner end face 38 oppose the completely flat surface of end face 36 of the cylinder head so that the combustion chamber 27 and the coolant passages 32, 34 are sealed by the cylinder head gasket assembly 22.

Figure 3:
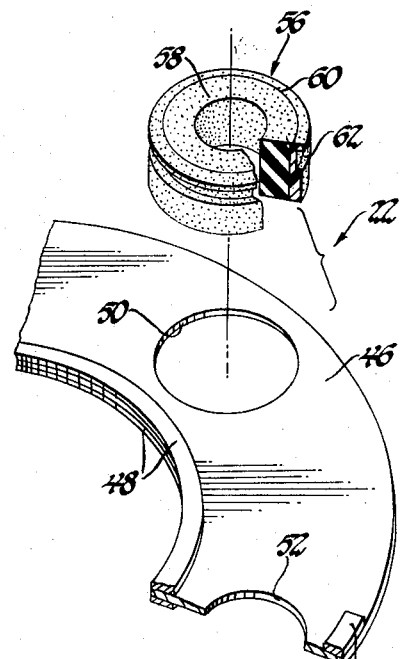
FIG. 3 is a pictorial view showing the construction of portions of the gasket assembly of FIGS. 1 and 2 in its pre-installed condition.

Gasket assembly 22, as shown in FIG. 3 prior to assembly, is made up of a thin annular sheet metal member 46 preferably formed of steel of from about .010 to .015 inch in thickness. On the upper and lower surfaces of member 46 at the inner periphery thereof there are provided raised annular metal portions 48 preferably formed of soft copper of about .0015 inch in thickness. Member 46 is provided radially outwardly of metal portions 48 with a plurality of coolant openings 50 which in assembly are aligned with the drilled passages 32, 34 of the cylinder head and liner respectively. Annularly spaced between certain of the coolant openings, metal member 46 is also provided with a plurality of openings 52 through which the studs 18, which secure together the cylinder head and liner, are adapted to pass. Radially outwardly of the stud openings 52 there are provided short segments 54 of raised metal portions which are preferably formed of copper of the same thickness as the metal portions 48. Segments 54 are optional and are intended to balance the compression forces on the raised metal portions at points adjacent the liner studs 18.

Within each of the coolant openings 50, the gasket assembly includes a loosely retained seal ring grommet 56 which is preferably formed from two materials, including an inner sealing portion 58, preferably formed of a resilient seal material, such as silicone rubber or other elastomeric material, and an outer insulating portion 60, preferably formed of a polytetrafluoroethylene (PTFE) base with a suitable proportion of filler material, such as glass. Inner and outer portions 58, 60 are concentric and coextensive, as seen in the drawing.

Closely spaced from one end of the seal ring 56, the outer portion 60 is provided with a peripheral groove 62. The outer diameter of portion 60 is just slightly larger than the diameter of the coolant openings 50 in the metal portion 46, while the inner diameter of the groove 62 is substantially smaller than the diameter of coolant openings 50 and the width of groove 62 is slightly greater than the thickness of metal member 46. This permits the grommets 56 to be snapped into place with the edges of openings 50 received within the groove 62 of the grommets so that the grommets are positively retained on member 46 within each of the coolant openings 50 but are free to move laterally within the scope of the differences in diameter between the bottoms of grooves 62 and openings 50.

Figure 2:
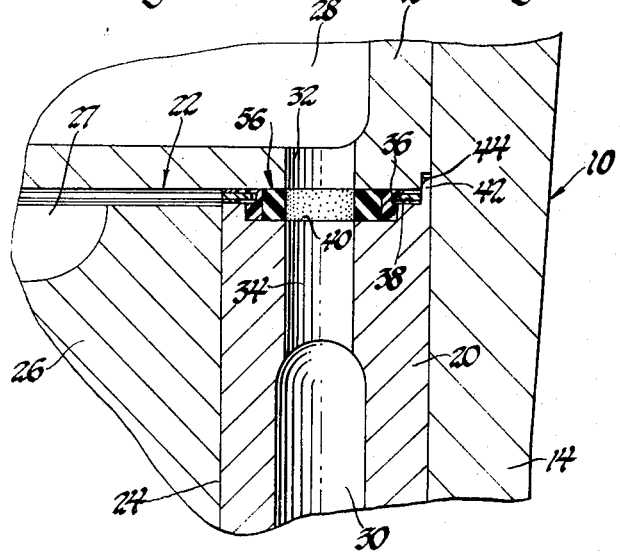
FIG. 2 is a cross-sectional view taken generally in the plane indicated by the line 2—2 of FIG. 1 and showing certain details of the coolant and combustion seal portions.

Installation of the seal assembly 22 is accomplished first by aligning the openings 52 in the metal member with the studs 18 carried in the liner and then sliding the assembly over the studs down to the end face 38 of the cylinder liner. At this point the loose retention of the grommets within metal member 46 permits lateral movement of the grommets as necessary to accommodate minor misalignment of the various coolant opening counterbores 40 so that all the grommets are allowed to properly align themselves and seat squarely within the counterbores 40. The cylinder head 16 is then installed and secured to the liner studs 18 so that its flat end face 36 engages and compresses the raised metal portions 48 and the grommets 56 of the seal assembly 22, as best shown in FIG. 2. In this way, a positive and long-lasting seal is provided for both the combustion chamber 27 and the coolant passages 32, 34 defined by the cylinder head and liner.

Figure 4:
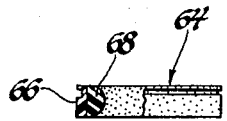
FIG. 4 is an elevational view partially in cross section and illustrating an alternative embodiment of seal ring grommet for use in a gasket assembly according to the invention.
Figure 5:
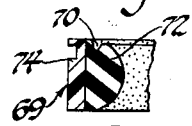
FIG. 5 is a fragmentary cross-sectional view showing a modification of the grommet member arrangement of FIG. 4.

It is noted that the seal grommet 56 of FIGS. 1–3 is provided with a generally rectangular cross section for both its inner and outer portions. In FIG. 4 there is illustrated an alternative embodiment 64 of grommet seal ring in which the outer insulating portion 66 is essentially like that of the first described embodiment but the inner sealing portion 68 is formed in a D shape. FIG. 5 shows another seal ring 69 comprising a variation of the embodiment of FIG. 4, in which a notch 70 is provided toward the top of the inner sealing portion 72, while the outer portion 74 is unchanged. Both the embodiments of FIGS. 4 and 5 provide improved sealing with less compression set of the rubber inner sealing portion, the notch 70 of FIG. 5 providing additional room for deformation of the upper end of both seal portions due to compression by the flat lower surface 36 of the cylinder head.

Figure 6:
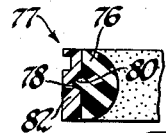
FIG. 6 is a fragmentary cross-sectional view showing another embodiment of seal ring grommet usable in a gasket assembly according to the invention.

The grommet seal arrangements of FIGS. 1–5 are intended to have their inner and outer portions secured together by any suitable means, such as bonding or molding the inner and outer portions together. The embodiment of FIG. 6 illustrates a mechanical interlocking arrangement for accomplishing the same result. In this arrangement the inner sealing portion 76 of the seal 77 has a peripheral tongue 78 which is received in a groove 80 of the outer insulating portion 82.

I claim:

1. A cylinder head gasket assembly for an internal combustion engine, said gasket assembly comprising
a flat metal sheet having a plurality of spaced openings therethrough and
a plurality of grommet seal rings received one in each of said openings, said seal rings being of slightly larger outer diameters than the diameters of their respective openings and having their outer peripheries grooved so as to fit loosely within said openings with provision for lateral movement of each seal ring within its opening, said seal rings being positively retained within their respective openings by virtue of the relative sizes of their outer diameters and the diameters of their respective openings.

2. The gasket assembly of claim 1, wherein said seal rings are formed from two concentric portions, the inner ones of said portions consisting of silicone rubber and the outer ones of said portions consisting of polytetrafluoroethylene base material and being provided with said grooved outer peripheries.

3. A cylinder head gasket assembly for an internal combustion engine, said gasket assembly comprising
a flat annular metal sheet adapted to surround a cylinder bore and having a plurality of annularly spaced coolant openings therethrough,
raised metal annular gasket portions on the upper and lower surfaces of said sheet and extending along the inner edges of said surfaces and
a plurality of grommet seal rings received one in each of said openings, said seal rings being of slightly larger outer diameters than the diameters of their respective openings and having their outer peripheries grooved adjacent one end so as to fit loosely within said openings with provision for lateral movement of each seal ring within its opening and with the ends of the seal rings being spaced close to the sheet in one direction, and farther from the sheet in the other direction, said seal rings being positively retained within their respective openings by virtue of the relative sizes of their outer diameters and the diameters of their respective openings.

4. The gasket assembly of claim 3 wherein said plate includes
   a plurality of annularly spaced bolt openings intermediate certain of said coolant openings and raised metal spacer portions on the upper and lower surfaces of said plate adjacent said bolt openings on the edges opposite from said gasket portions and
   said seal rings include concentric annular outer and inner portions, said inner portions consisting essentially of a resilient silicone rubber sealing material and said outer portions consisting essentially of a polytetrafluoroethylene base insulating material and being provided with said groove outer peripheries.

5. The gasket assembly of claim 4 wherein the inner and outer portions of said seal rings are molded together to form unitary rings.

6. The gasket assembly of claim 4 wherein the inner and outer portions of said seal rings are separately formed and are mechanically retained together by interlocking portions of their mating peripheries.

7. The combination in an internal combustion engine of
   a cylinder liner having a piston receiving bore, and terminating in a radial end wall surrounding said bore, a plurality of annularly spaced coolant openings through said end wall and each surrounded by an annular counterbore,
   a cylinder head closing the end of said bore, said head having a planar end wall opposing the radial end wall of said liner and a plurality of coolant openings aligned with said liner coolant openings, and
   a cylinder head gasket assembly disposed between and sealing the opposing end walls of said liner and said head, said gasket assembly including a flat annular metal sheet having a plurality of annularly spaced coolant openings aligned with the coolant openings of said liner and head, raised metal gasket portions extending annularly along the inner edges of the upper and lower surfaces of said metal sheet, said raised portions respectively engaging the opposed walls of said head and liner to provide a combustion seal around said cylinder bore and a plurality of grommet seal rings received one in each of the coolant openings of said metal sheet, said seal rings having outer diameters greater than the diameters of said coolant openings and having peripheral grooves by which said seal rings are loosely retained in said sheet, said seal rings also being received in said liner counterbores and compressed in sealing engagement with said head end wall so as to provide coolant retaining seals around said head and liner coolant openings.

References Cited
UNITED STATES PATENTS

| | | | |
|---|---|---|---|
| 2,210,453 | 8/1940 | Ginn | 277—235 B |
| 2,681,241 | 6/1954 | Aukers | 277—235 B X |
| 3,448,986 | 6/1969 | Jelinek et al. | 277—235 B X |

FOREIGN PATENTS

| | | | |
|---|---|---|---|
| 751,897 | 7/1956 | Great Britain | 277—180 |

ROBERT G. NILSON, Primary Examiner

U.S. Cl. X.R.

277—178, 182, 186, 235 B